(12) United States Patent
Mulholland

(10) Patent No.: US 9,296,874 B2
(45) Date of Patent: Mar. 29, 2016

(54) POLYACETAL COMPOSITIONS AND MOLDED PRODUCTS MADE THEREFROM

(75) Inventor: Bruce M. Mulholland, Hebron, KY (US)

(73) Assignee: Ticona LLC, Florence, KY (US)

( * ) Notice: Subject to any disclaimer, the term of this patent is extended or adjusted under 35 U.S.C. 154(b) by 807 days.

(21) Appl. No.: 13/444,361

(22) Filed: Apr. 11, 2012

(65) Prior Publication Data

US 2012/0277353 A1 Nov. 1, 2012

Related U.S. Application Data

(60) Provisional application No. 61/480,112, filed on Apr. 28, 2011.

(51) Int. Cl.
| | |
|---|---|
| C08L 59/02 | (2006.01) |
| C08K 5/3475 | (2006.01) |
| C08K 5/12 | (2006.01) |
| C08K 5/098 | (2006.01) |
| C08K 5/3492 | (2006.01) |
| C08K 5/09 | (2006.01) |

(52) U.S. Cl.
CPC .. C08K 5/09 (2013.01); C08L 59/02 (2013.01)

(58) Field of Classification Search
CPC ................................. C08K 5/09; C08L 59/02
USPC .................... 524/91, 100, 291, 400
See application file for complete search history.

(56) References Cited

U.S. PATENT DOCUMENTS

| | | | |
|---|---|---|---|
| 3,204,014 A | 8/1965 | Green | |
| 4,978,725 A * | 12/1990 | Reske et al. | 525/399 |
| 4,987,174 A * | 1/1991 | Ying et al. | C08K 7/10 524/444 |
| 5,043,398 A | 8/1991 | Auerbach et al. | |
| 5,338,815 A | 8/1994 | Aizawa et al. | |
| 5,407,996 A | 4/1995 | Aizawa et al. | |
| 5,455,042 A | 10/1995 | Sakai et al. | |
| 5,484,845 A | 1/1996 | Sasaki et al. | |
| 2005/0032950 A1 | 2/2005 | Lee et al. | |
| 2007/0027300 A1 | 2/2007 | Zirer et al. | |
| 2008/0242800 A1 | 10/2008 | Disch et al. | |
| 2010/0280156 A1 * | 11/2010 | Hase | 524/91 |

FOREIGN PATENT DOCUMENTS

| | | |
|---|---|---|
| EP | 0692521 | 1/1996 |
| JP | S 5552338 | 4/1980 |
| JP | S 5986614 | 5/1984 |
| JP | S 6090250 | 5/1985 |
| JP | H 07173368 | 7/1995 |
| JP | 7331028 | 12/1995 |
| JP | H 08208946 | 8/1996 |
| JP | H 08311302 | 11/1996 |
| JP | 2001131386 | 5/2001 |
| JP | 2001247745 | 9/2001 |

OTHER PUBLICATIONS

EP Search Report and Opinion for EP App. 12165766, Completed Oct. 11, 2012.
Chinese Search Report for Application No. 201210189739.2, dated Feb. 3, 2015.

* cited by examiner

*Primary Examiner* — Kriellion Sanders
(74) *Attorney, Agent, or Firm* — Dority & Manning, P.A.

(57) ABSTRACT

A polymeric composition containing a polyacetal resin in conjunction with a blend of metal salts for reducing formaldehyde emissions. In one embodiment, the blend of metal salts comprises a metal salt of a fatty acid blended with a metal salt of a polycarboxylic acid. The metal salt of the fatty acid may comprise calcium propionate, while the metal salt of the polycarboxylic acid may comprise calcium citrate. The metal salts have been found to reduce formaldehyde emissions, especially when the composition contains a low gloss additive, such as acrylic polymer particles.

20 Claims, No Drawings

POLYACETAL COMPOSITIONS AND MOLDED PRODUCTS MADE THEREFROM

CROSS REFERENCE TO RELATED APPLICATION

The present application is based on and claims the filing benefit of U.S. Provisional Patent Application Ser. No. 61/480,112 having a filing date of Apr. 28, 2011, and which is incorporated herein by reference.

BACKGROUND

Polyacetal polymers, which are commonly referred to as polyoxymethylenes (POMs), have become established as exceptionally useful engineering materials in a variety of applications. POMs for instance, are widely used in constructing molded parts, such as parts for use in the automotive industry and the electrical industry. POMs, for instance, have excellent mechanical property, fatigue resistance, abrasion resistance, chemical resistance, and moldability.

Although polyacetal resins possess many useful properties, the polymers have a tendency to degrade when heated and are inherently unstable in an oxidative atmosphere or in an acidic or alkaline environment. In particular, polyacetal resins have a tendency to emit formaldehyde during processing and after the polymer has been molded into a part. Formaldehyde is not only a contaminant, but can also adversely affect metallic components that may be placed in association with the polymer. For example, formaldehyde readily oxidizes to formic acid which can corrode metals or cause discoloration.

In view of the above, those skilled in the art have suggested using various stabilizers in molding compositions containing polyacetal polymers in order to suppress degradation. For example, various stabilizers are disclosed in JP-08208946, in Japanese Patent Application Kokai No. 60-90,250, in Japanese Patent Application Kokai No. 7-173,368 and in Japanese Patent Application No. 7-331,028. Various stabilizers that have been proposed in the past include, for instance, nitrogen containing compounds such as a dicyandiamide or an amino-substituted triazine compound.

Generally, the use of stabilizers described above such as melamines, benzoguanamine or hydrazines have been somewhat successful in achieving low formaldehyde emission performance. In some applications, however, it is desirable to produce articles and parts from polyacetal polymers that have a low gloss or matt finish. Consequently, in these embodiments, a low gloss additive may be added to the polymer composition. Adding a low gloss additive to reduce surface gloss, however, can significantly increase formaldehyde emissions even when the above stabilizers are present. Thus, further improvements are still needed in reducing formaldehyde emissions in polymer formulations containing polyacetal resins. In particular, a need exists for a polymer composition containing a polyacetal resin that produces low gloss products at reduced formaldehyde emissions.

SUMMARY

In general, the present disclosure is directed to a polymer composition containing primarily a polyacetal resin and to molded products made from the composition. The polymer composition of the present disclosure is particularly formulated so as to inhibit and/or reduce formaldehyde emissions during melt processing and after the product has been molded. In one embodiment, for instance, the polymer composition of the present disclosure is formulated to produce low gloss articles at very low formaldehyde emission levels.

For example, in one embodiment, the present disclosure is directed to a molded product. The molded product may comprise a polymeric article that has an outer surface having a gloss of less than about 10 gloss units when measured at a 60° angle using a glossmeter, and can particularly have a gloss of less than about 6 gloss units when measured at a 60° angle using a glossmeter. The polymeric article is formed from a polymer composition containing a polyacetal resin, such as a polyoxymethylene polymer. The polyacetal resin may be present in the composition in an amount of at least about 60% by weight, such as from about 60% by weight to about 95% by weight. In accordance with the present disclosure, in order to decrease formaldehyde emissions, the polyacetal resin is combined with at least two metal salts. The first metal salt is a metal salt of a fatty acid, while the second metal salt is a metal salt of a polycarboxylic acid. The metal salts are present in the composition in an amount sufficient for the composition to exhibit a formaldehyde emission of less than about 15 ppm, such as less than about 10 ppm, such as even less than about 5 ppm. Formaldehyde emission is measured according to VDA 275 (German Automotive Industry Recommendation No. 275) as documented by Kraftfahrwesen e. V., July 1994.

The metal salt of the fatty acid may comprise a metal salt of a fatty acid having a carbon chain containing from about 3 to about 20 carbon atoms. The metal salt of the fatty acid may comprise an alkaline earth metal salt. In one embodiment, the metal salt of the fatty acid may comprise a metal salt of a dicarboxylic acid. Particular examples include metal salts of propionate and/or metal salts of stearate. For example, in one embodiment, the metal salt of the fatty acid may comprise calcium propionate and/or calcium 12-hydroxystearate.

The metal salt of the polycarboxylic acid is different than the metal salt of the fatty acid. The metal salt of the polycarboxylic acid, for instance, may comprise a metal salt of a tricarboxylic acid. The metal salt of the polycarboxylic acid may comprise an alkaline earth metal salt. In one particular embodiment, the metal salt of the polycarboxylic acid may comprise calcium citrate.

The above metal salts can be present in the composition in amounts generally less than about 2% by weight, such as in amounts from about 0.1% to about 1% by weight. In one embodiment, the metal salts are present in an amount from about 0.05% to about 0.5% by weight.

In order to produce a molded product having low gloss or a matt finish, the composition can contain a low gloss additive. The low gloss additive may comprise particles, such as polymer particles. In the past, it was found that the low gloss additive has a tendency to increase formaldehyde emissions. The above metal salts, however, have been found to counteract this effect. Low gloss additives that may be used in accordance with the present disclosure include metal salts, such as zinc oxide, polytetrafluoroethylene particles, or acrylic polymer particles.

In general, any suitable polyacetal resin may be incorporated into the composition of the present disclosure. In one embodiment, the polyacetal resin may have an initial formaldehyde content of less than about 1,000 ppm, such as from about 20 ppm to about 500 ppm, such as from about 20 ppm to about 250 ppm, such as from about 20 ppm to about 150 ppm.

In one embodiment, in order to further reduce formaldehyde emissions, a formaldehyde scavenger, such as a nitrogen compound can also be combined with the other components. In this regard, further reductions in formaldehyde emissions may be possible when a nitrogen containing compound is present. The nitrogen containing compound, for instance, may comprise a heterocyclic compound having at least one nitrogen atom adjacent to an amino-substituted carbon atom or a carbonyl group. For instance, examples of nitrogen containing compounds that may be used include amino-substituted triazines. In one particular embodiment, the nitrogen containing compound may comprise a guanamine, such as benzoguanamine.

When present, the formaldehyde scavenger can be present in the composition in an amount generally less than 2 percent by weight, such as from about 0.01 percent to about 2 percent weight, such as from about 0.05 percent to about 0.5 percent by weight. The formaldehyde scavenger, for instance, should be added in amounts insufficient for the material to plate out and produce surface imperfections when producing molded articles. By using small amounts of the formaldehyde scavenger in conjunction with a polyacetal resin having a relatively low initial formaldehyde content (such as from about 20 ppm to less than about 1000 ppm, such as less than 500 ppm), the formaldehyde scavenger can be fully dispersed within the resulting composition and may even be solubalized in the composition during the formation of molded parts. In this regard, in one embodiment, the formaldehyde scavenger may have no perceived particle size within the resulting product.

Various other components and ingredients may also be contained in the composition. For instance, the composition may contain one or more lubricants, a nucleant, one or more pigments, one or more stabilizers, an antioxidant, and the like.

In one embodiment, the composition may contain one or more light stabilizers. The stabilizers, in one embodiment, may provide stability to the molded product when exposed to ultraviolet light. Light stabilizers that may be used include hindered amine light stabilizers, and one or more phenol stabilizers.

Polymeric compositions made according to the present disclosure can be used in numerous applications. For instance, in one embodiment, the composition may be used to form various molded parts for use in all different types of industries. In one particular embodiment, for instance, the composition may be used in producing automotive parts.

Other features and aspects are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polyacetal polymer compositions and to molded products made from the compositions that exhibit reduced formaldehyde emissions. In one embodiment, the polyacetal polymer composition is formulated in order to produce products having low gloss or a matt finish. In the past, additives incorporated into polyacetal compositions for lowering gloss had a tendency to increase formaldehyde emissions even in the presence of formaldehyde scavengers. In accordance with the present disclosure, a blend of metal salts are incorporated into the composition for counterbalancing the effect of any low gloss additives. It should be understood, however, that the blend of metal salts may be used in other applications (in addition to low gloss applications) for lowering formaldehyde emissions.

The blend of metal salts combined with the polyacetal resin in formulating compositions according to the present disclosure includes a combination of at least two different metal salts. The first metal salt, for instance, may comprise a metal salt of a fatty acid, and particularly an alkaline earth metal salt of a fatty acid. The fatty acid can contain a carbon chain of generally from about 3 carbon atoms to about 20 carbon atoms. The fatty acid may comprise a dicarboxylic acid or a tricarboxylic acid.

In one embodiment, the metal salt of the fatty acid may comprise a metal salt of propionic acid, stearic acid, butanoic acid, hexanoic acid, decanoic acid, lauric acid, myristic acid, palmitic acid, and the like. In one particular embodiment, the metal salt of the fatty acid may comprise calcium propionate and/or calcium 12-hydroxystearate. Both of the above calcium salts are salts of dicarboxylic acids.

The metal salt of the fatty acid may be combined with a metal salt of a polycarboxylic acid that is different and not the same as the metal salt of the fatty acid. The metal salt of the polycarboxylic acid may also comprise an alkaline earth metal salt. In one embodiment, the metal salt of the polycarboxylic acid may comprise a metal salt of a tricarboxylic acid. For example, in one embodiment, the metal salt of the polycarboxylic acid may comprise calcium citrate.

In order to reduce formaldehyde emissions, the metal salts can be present in the formulation in relatively low amounts. For instance, each metal salt may be contained in the composition in an amount of from about 0.01% by weight to about 2% by weight, such as from about 0.5% by weight to about 1% by weight. In one particular embodiment, for instance, each metal salt may be present in an amount of about 0.1% by weight.

The above combination of metal salts can reduce formaldehyde emissions from the polyacetal polymer even when the formulation contains one or more low gloss additives, which are known to increase formaldehyde emissions even in the presence of known formaldehyde scavengers. For example, a polymer composition containing a polyacetal polymer can be produced according to the present disclosure that exhibits a formaldehyde emission pursuant to VDA 275 of less than about 15 ppm, such as less than about 10 ppm, such as less than about 5 ppm, such as even less than about 3 ppm. The formaldehyde emission of the polyacetal polymer composition may be substantially zero or, in some embodiments, greater than about 1 ppm.

Without the combination of metal salts, in embodiments where the polyacetal polymer is combined with a low gloss additive, the composition may exhibit a formaldehyde emission of greater than 100 ppm even if containing one or more formaldehyde scavengers, Including a single metal salt in the formulation, such as a calcium propionate, may lower formaldehyde emissions by greater than 40%, such as greater than 50%, such as even greater than 60%. Further adding a metal salt of a polycarboxylic acid, however, has been found to synergistically reduce formaldehyde emissions to well below 15 ppm.

Polymer compositions made according to the present disclosure include a polymer matrix that is primarily comprised of a polyacetal resin, which is also commonly referred to as a polyoxymethylene polymer. In general, any suitable polyacetal resin can be used in accordance with the present disclosure. In one particular embodiment, a polyacetal resin is used that contains a relatively low amount of formaldehyde content. For example, the polyacetal resin can have an initial formaldehyde content of less than about 1,000 ppm, such as from about 20 ppm to about 500 ppm. For example, the polyacetal resin can contain formaldehyde in an amount from about 20 ppm to about 250 ppm, such as from about 20 ppm to about 150 ppm.

The polyacetal resin may comprise a homopolymer or a copolymer and can include end caps. The homopolymers may be obtained by polymerizing formaldehyde or trioxane, which can be initiated cationically or anionically. The homopolymers can contain primarily oxymethylene units in the polymer chain. Polyacetal copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

As described above, the homopolymers are generally prepared by polymerizing formaldehyde or trioxane, preferably in the presence of suitable catalysts. Examples of particularly suitable catalysts are boron trifluoride and trifluoromethanesulfonic acid.

Polyoxymethylene copolymers can contain alongside the —$CH_2O$— repeat units, up to 50 mol %, such as from 0.1 to 20 mol %, and in particular from 0.5 to 10 mol %, of repeat units of the following formula

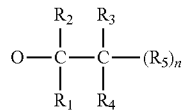

where $R^1$ to $R^4$, independently of one another, are a hydrogen atom, a $C_1$-$C_4$-alkyl group, or a halo-substituted alkyl group having from 1 to 4 carbon atoms, and $R^5$ is —$CH_2$—, —O—$CH_2$—, or a $C_1$-$C_4$-alkyl- or $C_1$-$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

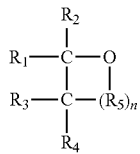

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

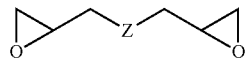

where Z is a chemical bond, —O— or —ORO— (R=$C_1$-$C_8$-alkylene or $C_2$-$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include end capped resins. Such resins, for instance, can have pendant hydroxyl groups. Such polymers are described, for instance, in U.S. Pat. No. 5,043,398, which is incorporated herein by reference.

In one embodiment, the polyacetal polymer may contain hemiformal terminal groups and/or formyl terminal groups. In particular, it is believed that the methods of the present disclosure can advantageously significantly reduce formaldehyde emissions of polyacetal polymers, even when the polymers contain hemiformal terminal groups and possibly formyl terminal groups. For instance, in one embodiment, the polyacetal polymer may contain hemiformal terminal groups in amounts greater than 1.0 mmol/kg, such as in amounts greater than 1.5 mmol/kg. In an alternative embodiment, the polyacetal polymer may contain formyl terminal groups in amounts greater than 2 mmol/kg, such as in amounts greater than 2.5 mmol/kg.

The processes used to form the polyoxymethylene polymers as described above can vary depending upon the particular application. A process, however, can be used which results in a polyacetal resin having a relatively low formaldehyde content. In this regard, in one embodiment, the polymer can be made via a solution hydrolysis process as may be described in U.S. Patent Application Publication Number 2007/0027300 and/or in United States Patent Application Number 2008/0242800, which are both incorporated herein by reference. For instance, in one embodiment, a polyoxymethylene polymer containing aliphatic or cycloaliphatic diol units can be degraded via solution hydrolysis by using methanol and water with triolethylene.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000. The polymer can have a meltflow rate (MVR 190-2.16) from about 0.3 to about 20 g/10 min, and particularly from about 2 to about 9 g/10 min (ISO 1133).

As described above, the polyacetal resin is combined with a blend of metal salts, particularly a metal salt of a fatty acid and a metal salt of a polycarboxylic acid. In addition to a blend of metal salts, the polymer composition can contain various other ingredients. For instance, in low gloss applications, the polymer composition may contain a low gloss additive. The low gloss additive, for instance, may comprise particles. The particles may impart texture to the finished product and/or may serve as light diffusers. The low gloss additive can decrease gloss and provide molded parts with a matt surface. Examples of low gloss additives that may be used include, in one embodiment, acrylic polymer particles, such as acrylic copolymer particles. One example of a low gloss additive, for instance, comprises PARALOID EXL-5136 modifier sold by The Dow Chemical Company. Other low gloss additives may include metal oxide particles, such as zinc oxide particles, polytetrafluoroethylene particles, and/or polymethylmethacrylate particles.

One or more low gloss additives may be present in the composition sufficient to reduce gloss to desired levels. In one embodiment, for instance, molded parts made in accordance with the present disclosure may exhibit a gloss of less than about 10 gloss units, such as less than about 8 gloss units, such as less than about 6 gloss units when measured at a 60° angle using a gloss meter. For example, one or more low gloss additives may be present in the composition in an amount of at least about 2% by weight, such as in an amount of at least about 5% by weight, such as in an amount of at least about 8% by weight. In general, the low gloss additives will be present in amounts less than about 25% by weight, such as in amounts less than about 20% by weight, such as in amounts of less than about 15% by weight.

In order to incorporate the blend of metal salts and the one or more low gloss additives into the polymer composition, in one embodiment, the above additives can be melt blended with the polyacetal polymer during production of a molded article. In other embodiments, however, the above additives may be partially or completely compounded with the polyacetal resin during melt processing, such as during extruding to form pellets. The compounded pellets can then be used in order to form molded products.

In order to further reduce formaldehyde emissions from the polymeric composition, the composition can contain a formaldehyde scavenger, such as a nitrogen containing compound. A formaldehyde scavenger is a compound that reacts and binds formaldehyde. When incorporating a nitrogen containing compound into the composition, the initial formaldehyde content of the polyacetal polymer is desirably low. For example, by using a polyacetal polymer that has an initial formaldehyde content of less than about 500 ppm, the nitrogen composition becomes well dispersed within the polymer and, in fact, has been found to solubilize within the polymer. In the past, on the other hand, when using polyacetal polymers having higher formaldehyde content, problems were experienced in getting the nitrogen containing compound into the polymer in a manner that did not interfere with other properties of the polymer. For instance, when using polyacetal polymers having higher formaldehyde content, the nitrogen containing compound may form particles within the resulting polymer matrix. In comparison, nitrogen containing compounds incorporated into compositions as described above can become finely dispersed within the resulting polymer having particle sizes less than 1 micron, or even preferably, having no distinguishable particle size.

In general, the total amount of formaldehyde scavengers present in the composition is relatively small. For instance, the formaldehyde scavengers can be present in an amount less than about 2 percent by weight, such as from about 0.01 percent to about 2 percent by weight, such as from about 0.05 percent to about 0.5 percent by weight (which excludes other nitrogen containing compounds that may be present in the composition that are not considered formaldehyde scavengers such as waxes or hindered amines). Any suitable formaldehyde scavenger can be included into the composition including, for example, aminotriazine compounds, allantoin, hydrazides, polyamides, melamines, or mixtures thereof. In one embodiment, the nitrogen containing compound may comprise a heterocyclic compound having at least one nitrogen atom adjacent to an amino substituted carbon atom or a carbonyl group. In one specific embodiment, for instance, the nitrogen containing compound may comprise benzoguanamine.

In still other embodiments, the nitrogen containing compound may comprise a melamine modified phenol, a polyphenol, an amino acid, a nitrogen containing phosphorus compound, an acetoacetamide compound, a pyrazole compound, a triazole compound, a hemiacetal compound, other guanamines, a hydantoin, a urea including urea derivatives, and the like.

The nitrogen containing compound may comprise a low molecular weight compound or a high molecular weight compound. The nitrogen-containing compound having a low molecular weight may include, for example, an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof [e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)], a polyaminotriazine [e.g., guanamine or a derivative thereof, such as guanamine, acetoguanamine, benzoguanamine, succinoguanamine, adipoguanamine, 1,3,6-tris(3,5-diamino-2,4,6-triazinyl)hexane, phthaloguanamine or CTU-guanamine, melamine or a derivative thereof (e.g., melamine, and a condensate of melamine, such as melam, melem or melon)], a salt of a polyaminotriazine compound containing melamine and a melamine derivative with an organic acid [for example, a salt with (iso)cyanuric acid (e.g., melamine cyanurate)], a salt of a polyaminotriazine compound containing melamine and a melamine derivative with an inorganic acid [e.g., a salt with boric acid such as melamine borate, and a salt with phosphoric acid such as melamine phosphate], uracil or a derivative thereof (e.g., uracil, and uridine), cytosine and a derivative thereof (e.g., cytosine, and cytidine), guanidine or a derivative thereof (e.g., a non-cyclic guanidine such as guanidine or cyanoguanidine; and a cyclic guanidine such as creatinine), urea or a derivative thereof [e.g., biuret, biurea, ethylene urea, propylene urea, acetylene urea, a derivative of acetylene urea (e.g., an alkyl-substituted compound, an aryl-substituted compound, an aralkyl-substituted compound, an acyl-substituted compound, a hydroxymethyl-substituted compound, and an alkoxymethyl-substituted compound), isobutylidene diurea, crotylidene diurea, a condensate of urea with formaldehyde, hydantoin, a substituted hydantoin derivative (for example, a mono or diC$_{1-4}$alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenylhydantoin), allantoin, a substituted allantoin derivative (e.g., a mono, di or triC$_{1-4}$alkyl-substituted compound, and an aryl-substituted compound), a metal salt of allantoin (e.g., a salt of allantoin with a metal element of the Group 3B of the Periodic Table of Elements, such as allantoin dihydroxyaluminum, allantoin monohydroxyaluminum or allantoin aluminum), a reaction product of allantoin with an aldehyde compound (e.g., an adduct of allantoin and formaldehyde), a compound of allantoin with an imidazole compound (e.g., allantoin sodium dl-pyrrolidonecarboxylate), an organic acid salt].

The nitrogen-containing resin may include, for example, a homo- or copolymer of a polyvinylamine, a homo- or copolymer of a polyallylamine, an amino resin obtainable from a reaction by using formaldehyde (e.g., a condensation resin such as a guanamine resin, a melamine resin or a guanidine resin; a co-condensation resin such as a phenol-melamine resin, a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (poly-β-alanine), nylon 46, nylon 6, nylon 66, nylon 11, nylon 12, nylon MXD6, nylon 6-10, nylon 6-11, nylon 6-12, or nylon 6-66-610, a substituted polyamide containing a methylol or alkoxymethyl group), a polyesteramide, a polyamideimide, a polyurethane, a poly(meth)acrylamide, a copolymer of (meth)acrylamide and other vinyl monomer, a poly(vinyllactam), a copolymer of vinyllactam and other vinyl monomer (for example, homo- or copolymers described in Japanese Patent Application Laid-Open No. 52338/1980 (JP-55-52338A), and U.S. Pat. No. 3,204,014)), a poly(N-vinylformamide) or a derivative thereof (e.g., an N-vinylformamide-N-vinylamine copolymer) (for example, trade name "PNVE Series" manufactured by Mitsubishi Chemical Corporation), a copolymer of N-vinylformamide and other vinyl monomer, a poly(N-vinylcarboxylic acid amide), a copolymer of N-vinylcarboxylic acid amide and other vinyl monomer (for example, homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and trade names "Noniolex" and "Cleatech" manufactured by Showa Denko K.K.), and others.

The nitrogen-containing compounds may be used singularly or in combination.

In one particular embodiment, the preferred nitrogen-containing compound includes a guanamine compound (e.g., adipoguanamine, and CTU-guanamine), melamine or a derivative thereof [particularly, melamine or a melamine condensate (e.g., melem, and melem)], a guanidine derivative (e.g., cyanoguanidine, and creatinine), a urea derivative [e.g., biurea, a condensate of urea with formaldehyde, allantoin, and a metal salt of allantoin (such as allantoin dihydroxyaluminum)], a hydrazine derivative (e.g., a carboxylic acid hydrazide), a nitrogen-containing resin [e.g., an amino resin (an amino resin such as a melamine resin or a melamine-formaldehyde resin; a crosslinked amino resin such as a crosslinked melamine resin), a polyamide resin, a poly(meth)acrylamide, a poly(N-vinylformamide), a poly(N-vinylcarboxylic acid amide), and a poly(vinyllactam)]. Among them, in particular, combination use of at least one member selected from the group consisting of biurea, allantoin, a metal salt of allantoin, a carboxylic acid hydrazide and a polyamide resin, and a guanamine compound having a unit represented by the above-mentioned formula (I) can bring in significant reduction of an amount of formaldehyde generated from the shaped article. The nitrogen-containing compound may be used as a resin master batch containing the compound [in particular, the carboxylic acid hydrazide (e.g., at least one member selected from the group consisting of the aliphatic carboxylic acid hydrazide and the aromatic carboxylic acid hydrazide)]. The nitrogen-containing compound [for example, the urea compound (e.g., biurea), and the carboxylic acid hydrazide (e.g., at least one member selected from the group consisting of the aliphatic carboxylic acid hydrazide and the aromatic carboxylic acid hydrazide)] may be used in the form of a master batch by melt-mixing the compound with a thermoplastic resin (e.g., a polyacetal resin, a styrenic resin, an acrylic resin, an olefinic resin, a polyamide-series resin, a polyurethane-series resin, and a polyester-series resin). The nitrogen-containing compound may be used as a resin master batch containing the compound.

In addition to the above components, the polymeric composition may contain various other additives and ingredients. For instance, the composition may contain colorants, light stabilizers, antioxidants, heat stabilizers, processing aids, and fillers.

Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

In one embodiment, the composition may contain a nucleant. The nucleant, for instance, may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in the composition include sterically hindered amines. Such compounds include 2,2,6,6-tetramethyl-4-piperidyl compounds, e.g., bis(2,2,6,6-tetramethyl-4-piperidyl) sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). In one embodiment, the light stabilizer may comprise 2-(2H-benzotriazol-2-yl) 4,6-bis(1-ethyl-1-phenyl-ethyl)phenol (Tinuvin 234). Other hindered amine light stabilizers that may be used include oligomeric compounds that are N-methylated. For instance, another example of a hindered amine light stabilizer comprises ADK STAB LA-63 light stabilizer available from Adeka Palmarole.

One or more light stabilizers may be present in the composition in an amount generally less than about 5% by weight, such as in an amount less than 4% by weight, such as in an amount less than about 2% by weight. The light stabilizers, when present, can be included in amounts greater than about 0.1% by weight, such as in amounts greater than about 0.5% by weight.

The above light stabilizers may protect the composition from ultraviolet light. In addition to the above light stabilizers, UV stabilizers or absorbers that may also be present in the composition include benzophenones or benzotriazoles.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm. The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

In one embodiment, the composition may also contain one or more lubricants. The lubricant may comprise a polymer wax composition. Lubricants that may be included in the composition include, for instance, n,n'-ethylene bissteara- mide. In one embodiment, a polyethylene glycol polymer may be present in the composition. The polyethylene glycol, for instance, may have a molecular weight of from about 1000 to about 5000, such as from about 3000 to about 4000. In one embodiment, for instance, PEG-75 may be present.

The polymer composition of the present disclosure can be used to produce various molded parts. The parts can be formed through any suitable molding process, such as an injection molding process or through a blow molding process. Polymer articles that may be made in accordance with the present disclosure include knobs, door handles, automotive interior panels, and the like without limitation.

The present disclosure may be better understood with reference to the following example.

Example 1

One example of a formulation made in accordance with the present disclosure is as follows:

| Ingredient | Amount |
|---|---|
| Polyoxymethylene polymer | 85.12% |
| Acrylic copolymer particles-low gloss additive | 12.00% |
| Butanediol diglycidyl ether, ethylene oxide, and trioxane terpolymer (nucleant) | 0.50% |
| PEG-75 (average molecular weight 3350) | 0.50% |
| Hindered amine light stabilizer | 0.50% |
| Benzoguanamine | 0.50% |
| 2-(2H-benzzotriazol-2-yl) 4,6-bis(1-ethyl-1-phenyl-ethyl)phenol (light stabilizer) | 0.40% |
| n,n'ethylene bisstearamide | 0.18% |
| Tetrakis(methylene(3,5-di-tert-butyl-4 hydroxyhydro-cinnamate))methane (antioxidant) | 0.10% |
| Calcium Citrate | 0.10% |
| Calcium Propionate | 0.10% |

The above formulation is believed to display a formaldehyde emission of less than about 15 ppm, such as less than 10 ppm.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A molded product comprising:
a molded polymeric article having an outer surface, the outer surface having a gloss of less than about 10 gloss units when measured at a 60° angle, the polymeric article being formed from a polymer composition comprising a polyacetal resin combined with a metal salt of a fatty acid, a metal salt of a polycarboxylic acid and a low gloss additive, wherein the metal salt of the fatty acid is different from the metal salt of the polycarboxylic acid, the metal salt of the fatty acid and the metal salt of the polycarboxylic acid being present in the polymer composition in an amount sufficient for the composition to exhibit a formaldehyde emission pursuant to VDA 275 of less than about 15 ppm.

2. A molded product as defined in claim 1, wherein the polymer composition exhibits a formaldehyde emission pursuant to VDA 275 of less than about 10 ppm.

3. A molded product as defined in claim 1, wherein the polymer composition exhibits a formaldehyde emission pursuant to VDA 275 of less than about 5 ppm.

4. A molded product as defined in claim 1, wherein the metal salt of the fatty acid comprises a metal salt of a fatty acid having a carbon chain containing from about 3 to about 20 carbon atoms, and wherein the metal salt of the polycarboxylic acid comprises a metal salt of a tricarboxylic acid.

5. A molded product as defined in claim 4, wherein the metal salt of the fatty acid and the metal salt of the polycarboxylic acid both comprise alkaline earth metal salts.

6. A molded product as defined in claim 4, wherein the metal salt of the fatty acid comprises a propionate or a stearate and the metal salt of the polycarboxylic acid comprises a citrate.

7. A molded product as defined in claim 1, wherein the metal salt of the fatty acid comprises calcium propionate and the metal salt of the polycarboxylic acid comprises calcium citrate.

8. A molded product as defined in claim 1, wherein the low gloss additive comprises metal oxide particles, polytetrafluoroethylene particles, polymethylmethacrylate particles, or mixtures thereof.

9. A molded product as defined in claim 1, wherein the low gloss additive comprises acrylic polymer particles.

10. A molded product as defined in claim 1, wherein the polymer composition further contains a formaldehyde scavenger.

11. A molded product as defined in claim 10, wherein the formaldehyde scavenger comprises benzoguanamine.

12. A molded product as defined in claim 1, wherein the polymer composition further contains an antioxidant.

13. A molded product as defined in claim 12, wherein the polymer composition further contains at least one light stabilizer, the at least one light stabilizer comprises a hindered amine light stabilizer.

14. A molded product as defined in claim 1, wherein the polyacetal resin comprises a polyoxymethylene polymer, the polyoxymethylene polymer being present in the polymer composition in an amount of at least 60% by weight.

15. A polyacetal polymer composition comprising:
a polyacetal resin present in the composition in an amount of at least 60% by weight, the polyacetal resin comprising a polyoxymethylene polymer;
a low gloss additive present in the polymer composition in an amount from about 3% to about 20% by weight, the low gloss additive comprising particles;
a blend of metal salts comprising a metal salt of a fatty acid combined with a metal salt of a tricarboxylic acid, the blend of metal salts being present in the composition sufficient for the composition to exhibit a formaldehyde emission pursuant to VDA 275 of less than about 10 ppm.

16. A polyacetal polymer composition as defined in claim 15, wherein the metal salt of the fatty acid comprises calcium propionate, calcium hydroxystearate. or mixtures thereof.

17. A polyacetal polymer composition as defined in claim 15, wherein the metal salt of the tricarboxylic acid comprises calcium citrate.

18. A polyacetal polymer composition as defined in claim 16, wherein the metal salt of the tricarboxylic acid comprises calcium citrate.

19. A polyacetal polymer composition as defined in claim 15, wherein the composition further contains a lubricant, a formaldehyde scavenger, and at least one light stabilizer.

20. A polyacetal polymer composition as defined in claim 19, wherein the formaldehyde scavenger comprises benzoguanamine.

* * * * *